Figure 1:
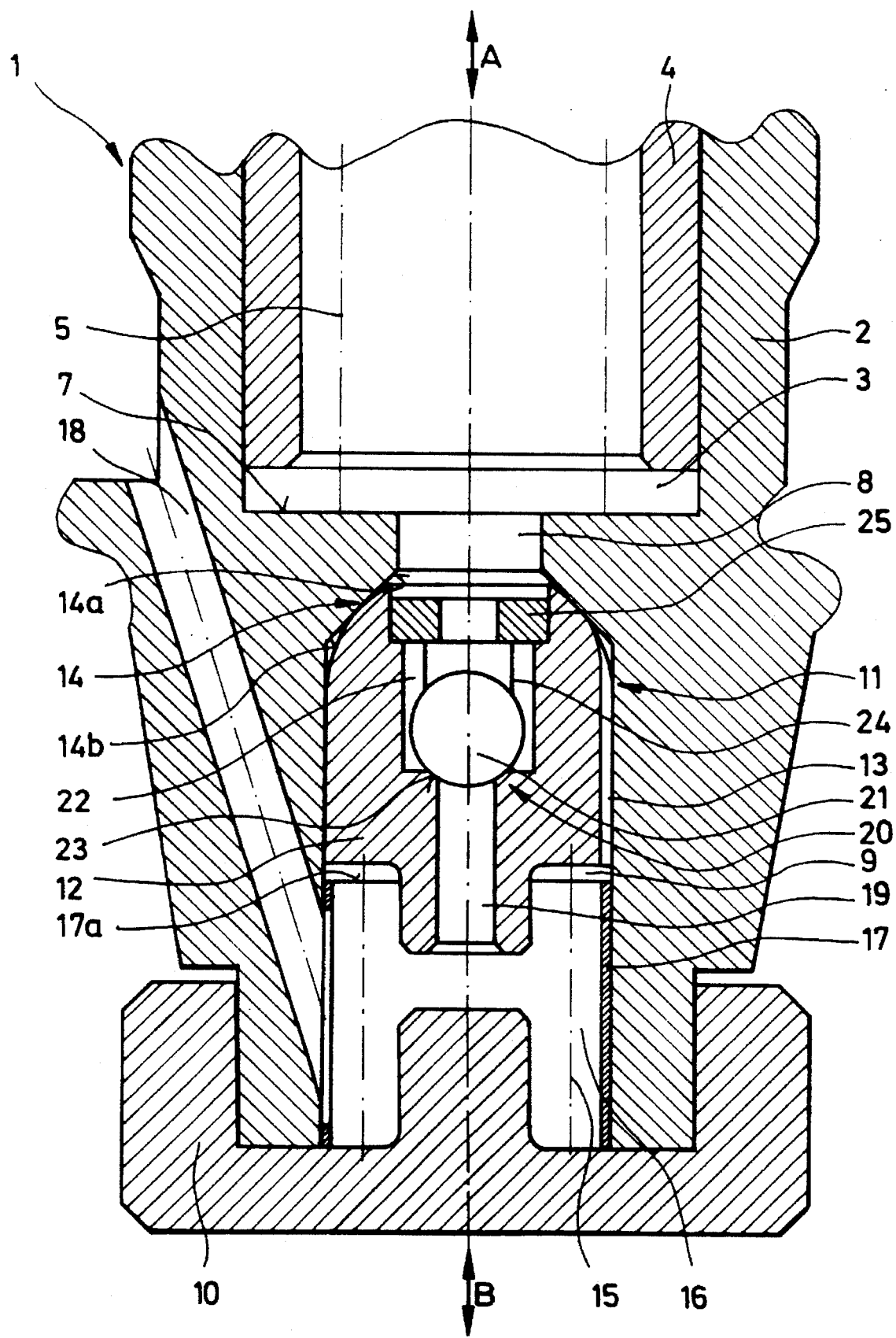

United States Patent [19]
Schulze

[11] Patent Number: 5,637,047
[45] Date of Patent: Jun. 10, 1997

[54] HYDRAULIC TENSIONER

[75] Inventor: Peter Schulze, Neufahrn, Germany

[73] Assignee: Joh. Winklhofer & Soehne GmbH & Co. KG, Munich, Germany

[21] Appl. No.: 458,057

[22] Filed: Jun. 1, 1995

[30] Foreign Application Priority Data

Jun. 6, 1994 [DE] Germany ............................ 9409155 U

[51] Int. Cl.$^6$ ..................................................... F16H 7/08
[52] U.S. Cl. ........................................ 474/110; 474/136
[58] Field of Search ..................................... 474/104, 110, 474/136, 135, 138

[56] References Cited

U.S. PATENT DOCUMENTS

| | | | |
|---|---|---|---|
| 4,838,300 | 6/1989 | Seabase | 137/224 |
| 5,176,581 | 1/1993 | Kumm | 474/110 |
| 5,181,889 | 1/1993 | Maruyama et al. | 474/110 |
| 5,193,579 | 3/1993 | Bauer et al. | 137/540 |
| 5,197,420 | 3/1993 | Arnold et al. | 474/110 X |
| 5,205,321 | 4/1993 | Maroney et al. | 137/493.3 |
| 5,271,429 | 12/1993 | Bauer et al. | 137/543.23 |

FOREIGN PATENT DOCUMENTS

| | | | |
|---|---|---|---|
| 0 348 861 | 1/1990 | European Pat. Off. | F16H 7/16 |
| 0 463 289 | 1/1992 | European Pat. Off. | B01D 35/147 |
| 40 35 823 | 11/1990 | Germany | F16H 7/08 |
| 90 16 594.2 | 4/1991 | Germany | B65D 81/20 |
| 1133725 | 11/1968 | United Kingdom | F16K 17/04 |

Primary Examiner—Roger J. Schoeppel
Attorney, Agent, or Firm—Seed and Berry LLP

[57] ABSTRACT

There is described a hydraulic tensioner (1, 101) for endless transmission elements, in particular a chain tensioner for internal combustion engines. The tensioner includes a housing (2, 102), a pressure chamber (3, 103) arranged in the housing, a piston (4, 104) which is movable in the pressure chamber (3, 103), a hydraulic fluid supply to the pressure chamber (3, 103), a check valve (20, 120) which is arranged within the hydraulic fluid supply and is acted upon by pressure in the pressure chamber (3, 103), and a means (11, 111) for automatically reducing the pressure in the pressure chamber (3, 103). To provide such a tensioner with a pressure-relief valve (11, 112) for automatically reducing pressure in the pressure chamber (3, 103), i.e., in a manner which is simple under constructional and technical manufacturing aspects and also reliable, the check valve (20, 120) should be connected to the valve member (12, 122) of the pressure-relief valve (11, 111).

17 Claims, 2 Drawing Sheets

5,637,047

HYDRAULIC TENSIONER

The invention relates to a hydraulic tensioner of the type specified in the preamble of claim 1, which is especially used for tensioning chains in internal combustion engines.

A hydraulic tensioner of this type is known from EP-A-348 861. The known tensioner comprises a piston which is movable in a pressure chamber in a housing and which presses against the chain. The piston is loaded by a piston spring toward the chain. The pressure chamber communicates with the hydraulic circuit of the engine, so that the piston is additionally loaded by the hydraulic pressure. The hydraulic supply to the pressure chamber takes place via a check valve which opens towards the pressure chamber and has a ball as a valve member and a correspondingly formed valve seat. Hence, when the tension of the chain decreases, the spring further presses the piston towards the chain whilst the resultant negative pressure in the pressure chamber opens the check valve and further sucks hydraulic fluid.

A leakage gap through which the pressure chamber will be relieved as soon as the chain is tensioned again, for instance due to vibrations, and presses against the piston is provided between the piston and the surrounding side walls of the housing. Since the leakage gap is always open, it effects, however, a draining of the pressure chamber as soon as the engine is at a standstill or the hydraulic pump of the hydraulic circuit no longer works. Such a draining is not prevented in the known tensioner. Rather, a venting possibility is provided for filling the pressure chamber again at a renewed start of the operation. Such a venting means, however, must always be arranged in a specific position to prevent the pressure chamber from being drained through the vent hole during filling or even during operation. As a result, the known tensioner can only be installed in a very specific predetermined position, for which purpose the constructional space if often missing.

Although attempts have already been made to provide another valve instead of the leakage gap, which valve opens only at a predetermined overpressure in the pressure chamber, so that tension peaks arising for a short period can be reduced, this construction suffers from a few drawbacks. On the one hand, it has been found that it is certainly possible that both valves are open at the same time. On the other hand, it has been found that in specific vibration states of the engine there arise resonant vibrations of the valve members that impair the function of both valves. Moreover, the constructional space for the installation of the pressure-relief valve is often missing.

It is therefore the object of the present invention to equip a hydraulic tensioner of the above-mentioned kind with a constructionally simple pressure-relief valve which is formed in a space-saving manner and is reliable.

This object is attained through the characterizing features of claim 1.

Pressure-relief valve and check valve are connected in the manner of a joint structural unit owing to the inventive design and are arranged at substantially the same place, whereby it is ensured that the same pressure conditions apply to the two valves. The response pressures and other parameters of the two valves can be adapted to one another in an improved manner owing to the design of the invention, so that there is an improved function of the tensioner. The design of the invention permits a compact construction which can still be used in case of very limited space. The tensioner of the invention can be produced in a simple manner, it can be mounted without problems and can be installed in the most different spatial positions, e.g., also in an upside-down position.

Claims 2–4 relate to an especially simple constructional design of the valve member of the pressure-relief valve.

The pressure force acting on the valve member of the pressure-relief valve can be predetermined by the design according to claim 5.

Claim 6 describes an especially preferred space-saving arrangement of the pressure-relief valve.

A certain amount of hydraulic fluid is retained by the measures according to claims 7 and 8 although the hydraulic circuit of the engine is drained off when the engine is stopped, so that the tensioner of the invention will be ready for operation again immediately upon start of the engine.

The measure according to claim 9 ensures that possibly arising resonant vibrations will differ in both valves, so that the vibrations cannot build up in an operation-interfering manner.

The opening pressure of the pressure-relief valve can be predetermined by the spring specified in claim 10.

The annular linear sealing contact according to claim 11 permits an exact predetermination of the area acted upon by the pressure in the pressure chamber.

Claim 12 describes an especially preferred possibility of establishing such an annular linear sealing surface, with the area to be acted upon being easily adapted to different uses of the tensioner of the invention by displacing the center of curvature.

Especially in the case of an upside-down installation of the tensioner of the invention, the measure according to claim 13 prevents hydraulic fluid from rapidly flowing out of the pressure chamber after the pressure-relief valve has been opened.

Claims 14 and 15 describe a constructionally specifically preferred possibility of defining the opening path of the pressure-relief valve, with the design according to claim 15 having the further advantage that the opening path can be adapted in a simple manner to different purposes by way of the length of the inserted sleeve.

Claim 16 describes a preferably used check valve.

Figure 2:
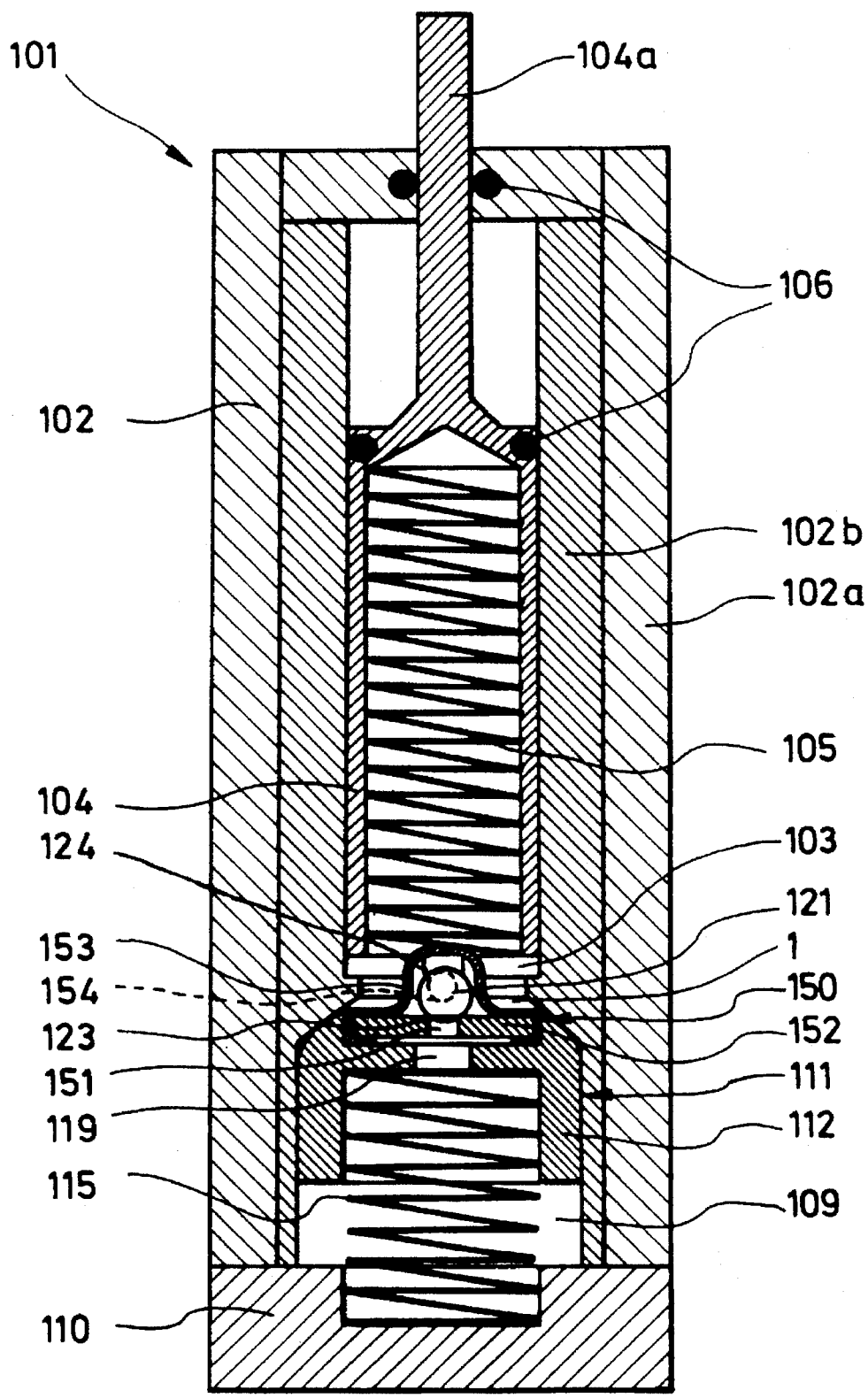

Embodiments of the invention shall now be explained with reference to the drawings, in which:

FIG. 1 is an enlarged partial view of a first embodiment of a tensioner of the invention in longitudinal section; and FIG. 2 is a longitudinal section through another embodiment of the tensioner of the invention.

FIG. 1 illustrates a hydraulic tensioner for tensioning endless transmission elements, such as belts or chains, the tensioner being especially suited as a chain tensioner for internal combustion engines. Tensioner 1 comprises a housing 2 which has provided therein a pressure chamber 3 formed as a blind hole. A piston 4 is axially movable in pressure chamber 3 in the direction of the double-headed arrow A. Piston 4 is loaded by a piston spring 5 (not shown in detail) which is supported on end face 7 of blind hole 3 and tries to push away piston 4 from end face 7.

Pressure chamber 3 communicates with a hole 9 via a communication channel 8 which is coaxially aligned with pressure chamber 3 and extends through end face 7, the hole being again formed as a blind hole which extends from the end facing away from pressure chamber 3 into housing 2 and is covered by a cover 10. Hole 9 is coaxial with pressure chamber 3.

Hole 9 has disposed therein a pressure-relief valve 11 whose valve member 12 is formed as a piston-like pressure member and which is movable in circumferential surface contact with the boundary walls of hole 9 in the direction of the double-headed arrow B in hole 9. Circumferentially distributed circumferential grooves 13 which extend in axial direction over the whole length of the circumference of valve member 12 are molded in valve member 12.

Valve seat 14 of pressure-relief valve 11 has a plane valve seat surface 14a and a curved valve seat surface 14b which effect an annular linear sealing contact. The plane valve seat surface 14a is formed as a conical surface and extends between communication channel 8 and the circumferential walls of hole 9. The curved valve seat surface 14b is provided on a front side of valve member 12. The distance of the annular linear sealing contact from the center of the communication channel 8 and thus the effective cross-sectional area of communication channel 8 can be determined by selecting the radius of curvature of the curved valve seat surface 14b, so that the size of the surface of valve member 12, which surface can be acted upon by the pressure prevailing in pressure chamber 3, can be predetermined by selecting a suitable radius of curvature.

Valve member 12 is pressed by a valve spring 15 into sealing contact of the two valve seat surfaces 14a, 14b, the spring being supported on cover 10 and acting on that front face of valve member 12 that is opposite to the valve seat surface 14b. Valve spring 15 is accommodated within a space 16 of hole 9 between cover 10 and valve member 12.

A sleeve 17 which is in circumferential contact with the boundary walls of hole 9 and is shorter in axial direction than the distance between valve member 12 and cover 10 is inserted in said space 16. The upper side of sleeve 17 which faces valve member 12 is formed as a stop surface 17a for the movement of valve member 12. Hence, the travel of valve member 12 and thus the maximum opening cross-section between valve seat surfaces 14a and 14b can be predetermined by suitably dimensioning the axial length of sleeve 17.

Hydraulic fluid is supplied to pressure chamber 3 through housing 2 via a channel 18 which terminates in space 16 and is connected to the hydraulic circuit of the engine, and via a channel 19 which connects both faces of valve member 12 of pressure-relief valve 11. Channel 19 extends centrally over the whole length of valve member 12 and can be shut off by means of a check valve 20. Check valve 20 includes one of the valve members 21 which are common and formed as balls, the valve member being arranged in an enlarged chamber 22 of channel 19 which is formed in the manner of a blind hole. Valve member 31 is seated on a correspondingly spherically formed valve seat surface 23 and is pressed by a valve spring 24 (not shown in more detail) onto the valve seat surface 23. Valve spring 24 is supported on a holding plate 25 which is passed through by channel 19 and which seals the enlarged chamber 22 relative to pressure chamber 3. Valve member 21 of check valve 20 is thus pressed away by valve spring 4 from pressure chamber 3.

The mass of check valve 20 and, in particular, that of its valve member 21 is substantially smaller than the mass of the valve member 12 of the pressure-relief valve 11, so that the two have very different resonant vibration characteristics, i.e., possibly arising resonant vibrations cannot "build up".

Space 16 may be formed as a collection chamber for hydraulic fluid by expediently selecting the position and discharge direction of channel 18, the hydraulic supply having an area which is above the valve member 12 in the position of installation. In the illustrated position of installation in which cover 10 forms the lowermost member of tensioner 1, the obliquely upwardly extending channel 18 prevents the collection chamber 16 and pressure chamber 3 from being drained off when the engine is stopped. In the case of an upside-down installation, i.e. cover 10 at the top, channel 18 could be passed through the cover 10 from the top.

Tensioner 1 of the invention operates as follows: Piston 4 is pressed by piston spring 5 into tensioning contact with the endless transmission element, in particular the chain. Check valve 20 is opened by the resultant negative pressure, i.e., ball 21 is lifted from its valve seat 23, so that hydraulic fluid will be further sucked from channel 18 and collection chamber 16 into pressure chamber 3 until the pressure in the pressure chamber 3 corresponds to the pressure in the hydraulic circuit, in particular channel 18 and collection chamber 16. The chain is tensioned. When the tension in the chain decreases, spring 5 presses piston 4 further upwards, resulting in further negative pressure in pressure chamber 3 which further sucks hydraulic fluid. When the tension in the chain rises above a predetermined value, for instance due to vibrations or the like, piston 4 is pressed towards the end face 7 against the force of valve spring 5. As a consequence, the pressure in pressure chamber 3 rises. The rising pressure acts on the valve member 12 of pressure-relief valve 11 via both the valve seat surface 14b and valve member 21 of check valve 20 and keeps the check valve 20 closed. If a pressure defined by the size of the actuation surface on the valve member 12 of pressure-relief valve 11 and valve spring 15 of the pressure-relief valve 11 is exceeded, valve member 12 is pressed toward cover 10, thereby, depending on the position of installation, either taking along sleeve 17 until the latter rests on cover 10, or moving towards cover 10 to such an extent that it will rest on stop surface 17a. A gap of a predetermined cross-sectional area through which hydraulic fluid flows or is pressed and passes via the circumferential grooves 13 into collection chamber 16 and optionally via channel 18 back into the hydraulic circuit is thereby opened between the valve seat surfaces 14a, 14b. As soon as the predetermined overpressure is reduced, valve spring 15 presses valve member 12 into sealing contact again, so that pressure chamber 3 will be closed again.

FIG. 2 shows another embodiment of the invention, with identical or comparable components being provided with the same reference numerals which, however, are increased by 100; these components need not be explained again. FIG. 2 shows a tensioner 101 comprising a housing 102 which consists of an outer casing 102a of aluminum and an inner steel sleeve 102b. Steel sleeve 102b surrounds the circumference of a pressure chamber 103 in which a piston 104 is movable. Piston 104 has a piston rod 104a which extends through housing 102. Piston rod 104a and piston 104 are sealed via seals 106 relative to housing 102.

A hole 109 which is closed with a cover 110 is provided in coaxial fashion with pressure chamber 104. Valve member 112 of a pressure-relief valve 111 which is formed as a piston-like pressure member moves inside hole 109. Valve member 112 is loaded by a valve spring 115.

The hydraulic fluid channel 119 through valve member 112 can be closed by a check valve formed as a prefabricated unit 150, which is inserted into an enlarged chamber 122. Check valve 115 contains a ball 121 which is acted upon by a valve spring 124 and forms a valve member which is seated on a correspondingly molded valve seat surface 123 which is arranged around an opening 151 formed as an extension of channel 119 in a plate 152. Plate 152, ball 121 and valve spring 123 are surrounded by a casing 153 of metal, thereby forming a unit. An extension of the entrance opening 151 and expedient exit ports 154 extend through casing 153. Check valve 150 which is formed as a unit is inserted from the seat surface side in chamber 122 of valve member 112 and is secured there. In this embodiment, too, the mass of valve member 112 is large in comparison with the mass of check valve 150.

The mode of operation of tensioner 110 corresponds to tensioner 100.

Details of the figure can be interchanged in a modification of the described and illustrated embodiments. For instance, the hole which receives the pressure-relief valve and is shown in FIG. 1 may be greater in diameter than the pressure chamber, as is shown in FIG. 2. The check valve can be mounted on the valve member of the pressure relief valve from the outside or can be connected in series in a different manner. The pressure-actuated surface sizes and the spring forces can be varied depending on the intended use or position of installation. Instead of the sleeve, other means may be provided for defining the opening path of the pressure-relief valve. In a position of installation which is turned by 180° in comparison with FIG. 1, and in which the hydraulic fluid must be pressed through the opening gap of the pressure-relief valve against gravitational force, a stop limitation can possibly be dispensed with. Finally, the invention can also be employed in other hydraulic tensioners having different piston shapes.

I claim:

1. A hydraulic tensioner for automatically maintaining a predetermined tension in an endless transmission element, in particular a chain tensioner for an internal combustion engine, said tensioner comprising a housing, a pressure chamber arranged in said housing, a piston movable in said pressure chamber, hydraulic fluid supply means for supplying hydraulic fluid of a predetermined fluid pressure to said pressure chamber, a check valve arranged within said housing, means within said housing for automatically reducing the pressure in said pressure chamber, and spring means biasing said piston for moving said piston in a first direction toward said transmission element, said piston having a first and a second side, said first side being subjected to said pressure in said pressure chamber, said second side being subjected to a pressure exerted upon by said transmission element tending to move said piston in a second direction thereby increasing said pressure in said pressure chamber, said check valve being adapted to open for supplying hydraulic fluid from said hydraulic fluid supply means into said pressure chamber when a force exerted upon said check valve by said pressure in said pressure chamber is less than a force exerted upon by said fluid pressure, said pressure reducing means comprising a pressure-relief valve arranged in said housing and adapted to be opened by a predetermined pressure in said pressure chamber, allowing hydraulic fluid to flow out of said pressure chamber, said pressure-relief valve including a valve member, and said check valve being connected in close proximity to said valve member of said pressure-relief valve.

2. A hydraulic tensioner according to claim 1 wherein said hydraulic fluid supply means includes a channel extending through the valve member of said pressure-relief valve said check valve being arranged to close said channel.

3. A tensioner according to claim 1 wherein said valve member of said pressure-relief valve is formed as a piston-like pressure member and is movable with circumferential surface contact in axial direction in a hole.

4. A tensioner according to claim 3, characterized in that relief grooves (13) are provided in the circumferential surface of said valve member (12, 112).

5. A tensioner according to claim 3 wherein said hole communicates with said pressure chamber via a communication channel of a predetermined cross-sectional area.

6. A tensioner according to claim 3 wherein said hole is coaxially accommodated with said pressure chamber in said housing.

7. A tensioner according to claim 1 wherein a collection chamber for hydraulic fluid is provided at the side of said valve member of said pressure-relief valve that faces away from said pressure chamber.

8. A tensioner according to claim 7, wherein said hole which receives said pressure-relief valve is longer in axial direction than said pressure relief valve member wherein said collection chamber is disposed in said hole, and wherein said hydraulic fluid supply has an area which is above said valve member in the position of installation.

9. A tensioner according to claim 3 wherein the mass of said valve member of said pressure-relief valve is large in comparison with the mass of said valve member of said check valve.

10. A tensioner according to claim 1 wherein said valve member of said pressure-relief valve is loaded by a spring with a predetermined resilient force.

11. A tensioner according to claim 10 wherein said valve seat of said pressure-relief valve is formed for an annular linear sealing contact.

12. A tensioner according to claim 11, characterized in that a valve seat surface (14b) on said valve member (12, 112) is curved and cooperates with a plane counterseat surface (14a).

13. A tensioner according to claim 1 wherein a means is provided for setting a maximum opening cross-section of said pressure-relief valve.

14. A tensioner according to claim 13, characterized in that said means contains a stop (17a) for defining the opening movement of said valve member (12, 112) of said pressure-relief valve (11, 111).

15. A tensioner according to claim 14, wherein said means for setting the maximum opening cross-section of said pressure-relief valve contains a sleeve of predetermined axial length which is inserted into said hole.

16. A tensioner according to claim 1 wherein said check valve contains a ball-shaped valve member and a correspondingly formed valve seat.

17. A hydraulic tensioner for automatically maintaining a predetermined tension in an endless transmission element, in particular a chain for an internal combustion engine, comprising:

a housing, a pressure chamber arranged in said housing, a piston movable in said pressure chamber, hydraulic fluid supply means for supplying hydraulic fluid of a predetermined fluid pressure to said pressure chamber, a check valve arranged within said housing, and a spring biasing said piston in a first direction toward said transmission element, said piston having a first and a second side, said first side being subjected to said pressure in said pressure chamber, said second side being subjected to a pressure exerted by said transmission element tending to move said piston in a second direction when the tension in the endless transmission element exceeds a selected value thereby increasing said pressure in said pressure chamber, said check valve being adapted to close when a force exerted upon said check valve by said pressure in said pressure chamber is greater than a force exerted upon it by said fluid pressure, and a pressure-relief valve arranged in said housing and adapted to be opened by a predetermined pressure in said pressure chamber, thereby automatically allowing hydraulic fluid to flow out of said pressure chamber, said pressure-relief valve including a valve member, and said check valve being connected in close proximity to said valve member of said pressure-relief valve, said piston moving towards said transmission element when the tension in the transmission element falls below the selected value, thereby decreasing said pressure in said pressure chamber, said check valve being adapted to open for supplying hydraulic fluid from said hydraulic fluid supply means into said pressure chamber when a force exerted upon said check valve by said pressure in said pressure chamber is less than a force exerted upon it by said fluid pressure.

* * * * *